United States Patent
Tasaka et al.

(10) Patent No.: US 6,395,833 B1
(45) Date of Patent: May 28, 2002

(54) THERMOPLASTIC ELASTOMERIC RESIN COMPOSITION AND A GRANULE THEREOF

(75) Inventors: Michihisa Tasaka; Toshimi Yamanaka, both of Tokyo (JP)

(73) Assignee: Riken Technos Corporation, Tokyo (JP)

(*) Notice: Subject to any disclaimer, the term of this patent is extended or adjusted under 35 U.S.C. 154(b) by 0 days.

(21) Appl. No.: 09/667,202

(22) Filed: Sep. 21, 2000

(30) Foreign Application Priority Data

| Sep. 24, 1999 | (JP) | 11-270773 |
| Sep. 24, 1999 | (JP) | 11-270781 |
| Sep. 24, 1999 | (JP) | 11-270782 |
| Feb. 2, 2000 | (JP) | 2000-025478 |

(51) Int. Cl.$^7$ .............. C08F 8/00; C08L 23/00; C08L 23/04; C08L 35/00; C08L 39/04

(52) U.S. Cl. .............. 525/192; 525/193; 525/194; 525/203; 525/205; 525/221; 525/232; 525/233; 525/236; 525/241; 525/244

(58) Field of Search .............. 525/192, 193, 525/194, 203, 205, 221, 232, 233, 236, 241, 244

(56) References Cited

U.S. PATENT DOCUMENTS

| 4,994,508 A | * | 2/1991 | Shiraki et al. .............. 524/14 |
| 5,346,964 A | * | 9/1994 | Shibata et al. .............. 525/314 |
| 5,696,200 A | * | 12/1997 | Maeda et al. .............. 524/575 |
| 5,936,037 A | * | 8/1999 | Tasaka .............. 525/92 B |

FOREIGN PATENT DOCUMENTS

| JP | 10-045976 | * | 2/1998 |
| JP | 10-081793 | * | 3/1998 |
| JP | 10-182900 | * | 7/1998 |
| JP | 10-310617 | * | 11/1998 |
| JP | 11-060826 | * | 3/1999 |

OTHER PUBLICATIONS

European Search Report dated Jan. 17, 2001.*

* cited by examiner

Primary Examiner—Nathan M. Nutter
(74) Attorney, Agent, or Firm—Pitney, Hardin, Kipp & Szuch LLP

(57) ABSTRACT

A thermoplastic elastomeric resin composition for powder molding, comprising a composition prepared by dynamically vulcanizing (a) a block copolymer of a vinyl aromatic compound and a conjugated diene compound, and/or a hydrogenated block copolymer thereof, (b) a non-aromatic softening agent for rubber, (c) a peroxide-decomposing olefinic resin, (d) an unsaturated glycidyl compound, (e) an unsaturated carboxylic acid or a derivative thereof, and (f) a liquid polybutadiene, and (h) at least one material selected from the group consisting of polyester, polyurethane, and polyamide polymers and copolymers; characterized in that (p) a compound represented by the following chemical formula (I) is also comprised:

$$H_2C=CH-CH_2-O-(C_nH_{2n}O)_m-X \quad (I)$$

wherein n is an integer of from 2 to 5, $C_nH_{2n}$ may be branched, x represents H or $CH=CH_2$, m is the number of the repeating unit, $C_nH_{2n}O$, and a number average molecular weight of the compound is in a range of from 200 to 6,000.

14 Claims, No Drawings

US 6,395,833 B1

THERMOPLASTIC ELASTOMERIC RESIN COMPOSITION AND A GRANULE THEREOF

FIELD OF THE INVENTION

The present invention relates to a thermoplastic elastomeric resin composition and resin granules thereof having an excellent fluidity suited to powder molding.

DESCRIPTION OF THE PRIOR ART

Powder molding methods, such as rotational powder molding, are widely used to produce a surface akin for automobile interior parts, such as instrumental panels, console boxes and the like. To easily provide the molded skin with leather grain patterns or stitches on their surfaces so as to attain softness to touch, polyvinyl chlorides have been used. However, from the environmental viewpoint, thermoplastic elastomers or polyurethane resins are increasingly used instead of the polyvinyl chlorides.

A rotational powder molding method is mainly used to mold the thermoplastic elastomers or the polyurethane resins. For this molding method, the powder should have good fluidity in order that the powder adheres uniformly on the surface of a mold with a complicated shape, and also that an excess charge of the powder is removed easily.

For the purpose of providing thermoplastic elastomeric resin powder having an improved fluidity, various kinds of thermoplastic elastomer and powder thereof have been proposed. For example, Japanese Patent Application Laid-Open H10-45976 discloses thermoplastic elastomer powder having a sphere-equivalent average diameter of larger than 0.7 mm to 1.20 mm and a bulk density of at least 0.38, where the thermoplastic elastomer is prepared by dynamically vulcanizing a composition comprising a polyolefin resin and ethylene-α-olefin copolymer rubber. Japanese Patent Application Laid-Open H10-81793 discloses powder comprising the aforesaid resin composition and a hydrogenated conjugated diene polymer or a random copolymer of a hydrogenated conjugated diene polymer with a vinyl aromatic compound. Japanese Patent Application Laid-Open H10-182900 discloses a thermoplastic elastomer for powder slush molding comprising a polypropylene resin, hydrogenated styrene butadiene rubber, a process oil and an elastomer such as styrene/ethylene-propylene/styrene block copolymer. Likewise, Japanese Patent Application Laid-Open H11-60826 discloses a powdery resin composition comprising a polyolefin type polymer and a hydrogenated diene type polymer, wherein stickiness of the resins is suppressed so as to improve the fluidity.

These powder resins are prepared by several methods. For example, one method is a freeze-crushing method where the resin is frozen with liquid nitrogen or the like and crushed in a mill such as a turbo mill, a roller mill, and a hammer mill. Another method is to extrude a resin through a die into a strand which is then drawn, cooled, and subsequently cut. Likewise, the powder resins may be prepared by crushing the thermoplastic elastomer at a temperature of its glass transition or below, and then treating with a solvent.

These powder resins, however, tend still to adhere and coagulate, and still need improvement in its fluidity. In addition, the powder resins are difficult to handle on site and also cause problems due to dust. Accordingly, it is an object of the invention to solve the above-mentioned fluidity problem associated with powder resins in powder molding.

Further, because the sheer force applied to a molten resin is smaller in powder molding, the resin should therefore have a good melt flowability in its molten state to give a uniform thickness to the molded article. Usually, in the powder molding of a thermoplastic elastomer, a sufficient melt flowability cannot be attained unless a mold temperature is set considerably high, e.g., 300° C., compared to that for polyvinyl chloride. The mold is repeatedly heated to such a high temperature and cooled. As a result, the mold deteriorates faster due to metal fatigue. Accordingly, it is another object of the invention to provide a thermoplastic elastomeric resin composition having a good melt flowability even at lower mold temperatures.

In addition, molded articles obtained from thermoplastic elastomers are not satisfactory in terms of oil resistance and abrasion resistance. Japanese Patent Application Laid-Open H10-310617 discloses a thermoplastic elastomer composition comprising a polyurethane resin, in which the composition has improved oil resistance and abrasion resistance. The composition is intended to be subjected to injection molding, and therefore does not have a melt flowability sufficient for powder molding. Accordingly, it is still another object of the invention to provide thermoplastic elastomeric resin composition having excellent oil resistance and abrasion resistance as well as good melt flowability.

SUMMARY OF THE INVENTION

A purpose of the present invention is to provide a resin composition having good melt flowability. Thus, the present invention is a thermoplastic elastomeric resin composition for powder molding, comprising a composition prepared by dynamically vulcanizing
100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
20 to 300 parts by weight of (b) a non-aromatic softening agent for rubber,
10 to 150 parts by weight of (c) a peroxide-decomposing olefinic resin and/or a copolymer containing said resin,
0.01 to 15 parts by weight of (d) an unsaturated glycidyl compound,
0.01 to 15 parts by weight of (e) an unsaturated carboxylic acid or a derivative thereof, and
1 to 30 parts by weight of (f) a liquid polybutadiene, and
10 to 2,500 parts by weight of (h) at least one material selected from the group consisting of polyester polymers and copolymers; polyurethane polymers and copolymers, and polyamide polymers and copolymers;

characterized in that
10 to 200 parts by weight of (p) a compound represented by the following chemical formula (I) is also dynamically vulcanized or kneaded with said vulcanized composition or with said vulcanized composition and component (h):

$$H_2C=CH-CH_2-O-(C_nH_{2n}O)_m-X \qquad (I)$$

wherein n is an integer of from 2 to 5, $C_nH_{2n}$ may be branched, x represents B or $CH=CH_2$, m is the number of the repeating unit $C_nH_{2n}O$, and a number average molecular weight of the compound is in a range of from 200 to 6,000.

In the aforesaid composition, it is preferred that component (p) is a chemical compound represented by the following chemical formula (II) or (III):

$$H_2C=CH-CH_2-O-(C_3H_6O)_{m1}-H \qquad (II)$$

wherein the number average molecular weight is in a range of from 1,200 to 1,800, $$H_2C=CH-CH_2-O-(C_3H_6O)_{m2}-CH=CH_2 \qquad (III)$$

wherein the number average molecular weight is in a range of from 2,500 to 3,500.

The present invention also provide a thermoplastic elastomeric resin composition for powder molding, comprising
a composition prepared by dynamically vulcanizing
100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
20 to 300 parts by weight of (b) a non-aromatic softening agent for rubber,
10 to 150 parts by weight of (c) a peroxide-decomposing olefinic resin and/or a copolymer containing said resin,
0.01 to 15 parts by weight of (d) an unsaturated glycidyl compound,
0.01 to 15 parts by weight of (e) an unsaturated carboxylic acid or a derivative thereof, and
1 to 30 parts by weight of (f) a liquid polybutadiene; and
10 to 2,500 parts by weight of (u) a thermoplastic polyurethane resin, characterized in that said component (u) is derived from a polyol having a number average molecular weight of from 600 to 3,000 and has a number average molecular weight of from 10,000 to 500,000.

Further, the present invention provide a thermoplastic elastomeric resin composition having good flowability, comprising
a composition prepared by dynamically vulcanizing
100 parts by weight of (s) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
0.01 to 15 parts by weight of (d) an unsaturated glycidyl compound,
0.01 to 15 parts by weight of (e) an unsaturated carboxylic acid or a derivative thereof, and
1 to 30 parts by weight of (f) a liquid polybutadiene; and
10 to 2,500 parts by weight of (h) an at least one material selected from the group consisting of polyester polymers or copolymers, polyurethane polymers or copolymers, and polyamide polymers or copolymers, characterized in that said component (s) has a weight average molecular weight reduced from polystyrene of from 5,000 to 100,000.

Another purpose of the present invention is to provide resin granule having good fluidity. Thus, the present invention is a thermoplastic elastomeric resin granule for powder molding, comprising the thermoplastic elastomeric composition for powder molding according to any one of the aforesaid compositions and having a longest diameter of 400 μm or less and a ratio of the longest diameter to a shortest diameter of from 3:1 to 1:1.

The present invention also provide a thermoplastic elastomeric resin blend, characterized in that said compound comprising
60 to 95 weight per cent of the resin granule according to claim 6 or 10, and
40 to 5 weight per cent of resin powder prepared by freeze-crushing at least one material selected from the group consisting of thermoplastic elastomers, polyester polymers or copolymers, polyurethane polymers or copolymers, and polyamide polymers or copolymers, said powder having a size to pass a 42-mesh screen.

DESCRIPTION OF THE PREFERRED EMBODIMENTS

Components to Be Used in the Present Invention
Component (a), Block Copolymer

Component (a) used in the invention is a block copolymer consisting of at least two polymeric blocks (A) composed mainly of a vinyl aromatic compound and at least one polymeric block (B) composed mainly of a conjugated diene compound, or a hydrogenated block copolymer obtained by hydrogenating the aforesaid block copolymer, or a mixture thereof, such as vinyl aromatic compound-conjugated diene compound block copolymers having a structure, A-B-A, B-A-B-A or A-B-A-B-A, or those obtained by hydrogenating such. The block copolymer and/or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists solely of a vinyl aromatic compound or is a copolymeric block comprising more than 50% by weight, preferably at least 70% by weight, of a vinyl aromatic compound and an optional component such as a conjugated diene compound and/or a hydrogenated conjugated diene compound (hereinafter referred to as (hydrogenated) conjugated diene compound). Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with an optional component such as a vinyl aromatic compound. The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene and/or isoprene.

Any microstructure may be selected in the polymeric block B composed mainly of the conjugated diene compound. It is preferred that the block derived from butadiene has 20 to 50%, more preferably 25 to 45%, of 1,2-microstructure. in the block derived from isoprene, it is preferred that 70 to 100% by weight of isoprene is in 1,4-microstructure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 550,000, particularly 100,000 to 400,000. A ratio of the weight average molecular weight (Mw) to the number average molecular weight (Mn), Mw/Mn, is preferably 10 or less, more preferably 5 or less, particularly 2 or less. Molecule structure of the (hydrogenated) block copolymer may be linear, branched, radial or any combination thereof.

Many methods were proposed for the preparation of such block copolymers. As described, for instance, in JP Publication 40-23798/1965, block polymerization maybe carried out using a lithium catalyst or a ziegler catalyst. in an inert solvent. The hydrogenated block copolymer may be obtained by hydrogenating the block copolymer thus obtained in the presence of a hydrogenation catalyst in an inert solvent.

Examples of the (hydrogenated) block copolymer include SES, SIS, SEBS and SEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-microstructure and 90% of the aliphatic double bonds derived from isoprene is hydrogenated. More preferably, 90 to 100% by weight of isoprene has 1,4-microstructure in the aforesaid hydrogenated block copolymer.

Component (b), Non-Aromattic Softening Agent for Rubber

Non-aromatic mineral oils, and liquid or low molecular weight synthetic softening agents may be used as component (b) of the invention. Mineral oil softening agents used for rubber are mixtures of aromatic cyclic ones, naphthenic cyclic ones and paraffinic ones. Those in which 50% or more of the whole carbon atoms is in paraffinic chains are called a paraffinic type; those in which 30 to 40% of the whole carbon atoms is in naphthenic rings are called a naphthenic type; and those in which 30% or more of the whole carbon atoms is in aromatic rings are called an aromatic type.

Mineral oil softening agents for rubber to be used as component (b) according to the invention are of the aforesaid paraffinic or naphthenic type. Aromatic softening agents are improper, because they make component (a) soluble and hinder the crosslinking reaction so that physical properties of a composition obtained are not improved. Paraffinic ones are preferred as component (b). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

The amount of component (b) to be blended is in a range of from 20 to 300 parts by weight, preferably from 40 to 300 parts by weight, more preferably from 80 to 200 parts by weight, most preferably from 100 to 170 parts by weight, per 100 parts by weight of component (a). If the amount is higher than the aforesaid upper limit, the Component (c), Peroxide-Decomposing Type Olefinic Resin or A Copolymer Containing The Same Component (c) attains an effect of improving dispersion of component (a) in the composition obtained to thereby improve appearance of a molded article. Component (c) is blended in an amount of 10 to 150 parts by weight, preferably 25 to 100 parts by weight, per 100 parts by weight of component (a). If the amount is less than the aforesaid lower limits moldability of the elastomer composition obtained is deteriorated. If it exceeds the aforesaid upper limit, softness and rubber elasticity of the elastomer composition are deteriorated.

A peroxide-decomposing type olefinic resin suitable as component (c) in the present invention has at least 20% of rrrr/1-mmmm in a pentad ratio in a $^{13}C$— nuclear magnetic resonance method and a fusion peak temperature (Tm) of at least 150° C., preferably 150 to 167° C., and fusion enthalpy (ΔHm) of at most 100 J/g, preferably 25 to 83 mJ/mg. as determined by differential scanning calorimetry (DSC). Crystallinity may be estimated from Tm and ΔHm. If Tm and ΔHm are out of the aforesaid ranges, rubber elasticity at 100° C. or higher of the elastomer composition obtained is not improved.

Peroxide-decomposing type olefinic resin suitable as component (c) in the present invention is high molecular weight propylene homopolymers such as isotactic polypropylenes, or copolymers of propylene with a smaller amount of other α-olefine such as ethylene, 1-butene, 1-hexene or 4-methyl-1-pentene. These resins preferably have an MFR (ASTM D-1238, Condition A, 230° C.) of 0.1 to 10 g/10 min., more preferably 3 to 8 g/10 min.

If the MFR of the peroxide-decomposing type olefinic resin is less than 0.1 g/10 min., moldability of the elastomer composition obtained is deteriorated. If it exceeds 10 g/10 min., rubber elasticity of the elastomer composition obtained is deteriorated.

Besides those described above, use may be made of a peroxide-decomposing type olefinic resin composed of boiling heptane-soluble polypropylene having a number average molecular weight (Mn) of at least 25,000 and a ratio of Mw to Mn, Mw/Mn, of at most 7 and boiling heptane-insoluble polypropylene having a melt index of 0.1 to 4 g/10 min. or a peroxide-decomposing type olefinic resin composed of boiling heptane-soluble polypropylene having an intrinsic viscosity [η] of at least 1.2 dl/g and boiling heptane-insoluble polypropylene having an intrinsic viscosity [η] of 0.5 to 9.0 dl/g.

Component (d), Unsaturated Glycidyl Compound or Derivative Thereof

By subjecting the unsaturated glycidyl compound or derivative thereof to the dynamic vulcanization, the resultant resin composition has improved oil resistance and abrasion resistance. Preferably, a glycidyl compound having an unsaturated functional group which may copolymerize with olefin, and a glycidyl group is used, such as, particularly, glycidyl methacrylate. Preferably, polyethylene and polypropylene are modified by the unsaturated glycidyl compound or derivative thereof. That is, a soft component in component (a), hydrogenated block copolymer, and component (c), peroxide-decomposing type olefinic resin and/or a copolymer containing said resin, are modified.

Component (d) is blended in an amount of at most 15 parts by weight, preferably at most 10 parts by weight, and at least 0.01 part by weight, preferably at least 0.1 part by weight, more preferably at least 3 parts by weight, per 100 parts by weight of component (a) or (s). If the amount exceeds the upper limit, heat deformation resistance and mechanical properties of the composition are deteriorated and, in addition, the effect of improving compatibility of component (h) or component (u) is not observed.

Component (e), Unsaturated Carboxylic Acid or Derivative Thereof

By subjecting the unsaturated carboxylic acid or derivative thereof to the dynamic vulcanization, the resultant resin composition has improved oil resistance and abrasion resistance. Preferred examples of the unsaturated carboxylic acid or derivative thereof include acrylic acid, methacrylic acid, maleic acid, dicarboxylic acid or derivatives thereof such as acids, halides, amides, imides, anhydrides or esters. Particularly, maleic anhydride (MAH) is preferably used. Preferably, polypropylene is modified by the unsaturated carboxylic acid or derivative thereof. That is, it is believed that a soft component in component (a), hydrogenated block copolymer, and component (c), peroxide-decomposing type olefinic resin and/or a copolymeric rubber containing said resin, are modified.

Component (e) is blended in an amount of at most 15 parts by weight, preferably at most 10 parts by weight, and at least 0.01 part by weight, and preferably at least 0.1 part by weight, more preferably at least 5 parts by weight, per 100 parts by weight of component (a) or (s). If the amount exceeds the upper limit, conspicuous yellowing occurs in the composition and heat deformation resistance and mechanical properties of the composition are not good and, in addition, the effect of improving compatibility of component (h) or component (u), if blended, is not observed.

Component (f), Liquid Polybutadiene

Liquid polybutadiene is a polymer in which microstructure of a main chain is composed of vinyl 1,2-bonding, trans 1,4-bonding and cis 1,4-bonding and which is a transparent liquid at room temperature. The vinyl 1,2-bonding amounts to preferably 30% by weight or less. If the vinyl 1,2-bonding exceeds 30% by weight, the properties of the composition obtained tends to deteriorate.

A number average molecular weight of the liquid polybutadiene is preferably at most 5,000, more preferably at most 4,000, and preferably at least 1,000, more preferably at least 3,000. If the number average molecular weight is below the lower limit, the heat deformation resistance of the composition obtained tends to become worse. Meanwhile, if it exceeds the upper limit, the compatibility in the composition obtained tends to become worse.

The liquid polybutadiene is preferably a copolymerizable compound having one or more groups selected from epoxy, hydroxyl, isocyanate and carboxyl groups. Among these, one having a hydroxyl group and a copolymerizable unsaturated double bond is particularly preferred, for example, R-45HT, trade mark, ex Idemitsu Petrochemical Co.

Component (f) is blended in an amount of at most 30 parts by weight, preferably at most 10 parts by weight, and at least 1 part by weight, preferably at least 3 parts by weight, per 100 parts by weight of component (a) or (s). If the amount is below the lower limit, effects of blending it is not observed, while if it exceeds the upper limit, the mechanical properties of the composition is deteriorated.

Component (h), Polyester Type (Co)Polymer, Polyamide Type (Co)Polymer or Polyurethane Type (Co)Polymer The copolymer which is used as component (h) in the invention may be a block or graft copolymer. The (co)polymers preferably have elastomeric properties. Commercially available polymers may be used satisfactorily. The copolymers are particularly preferred. The (co)polymers may be used alone or in a combination. Examples of the polyester type (co)polymer include (co)polymers in which a hard component is an aromatic polyester and a soft component is an aliphatic polyether, or in which a hard component is an aromatic polyester and a soft component is an aliphatic polyester, or in which a hard component is polybutylene naphthalate and a soft component is an aliphatic polyether. Examples of the polyamide type (co)polymer include nylon-6, nylon-6,6, nylon-4,6, nylon-6,10, nylon-6,12, and block elastomers in which a hard component is polyamide and a soft component is polyether, or a hard component is polyamide and a soft component is polyetherester, wherein the polyamide is nylon-6 type or nylon-12. Examples of the polyurethane type (co)polymer include lactone type, ester type or ether type (co)polymers.

The amount of component (h) to be blended is at least 1.0 part by weight, preferably at least 100 parts by weight, more preferably at least 500 parts by weight and is at most 2,500 parts by weight, preferably at most 1,500 parts by weight, per 100 parts by weight of component (a) or (s). Particularly, it is preferred that the polyester type (co)polymer is blended at least 150 parts by weight; the polyamide type (co)polymer, at least 100 parts by weight; and the polyurethane type (co)polymer, at least 200 parts by weight. If the amount is more than 2,500 parts by weight, softness of the elastomer composition obtained decreases to be little different from that of the polyester type (co)polymer, polyamide type (co)polymer or polyurethane type (co)polymer.

In the present invention, blending of component (h) drastically improves oil resistance and stain resistance of an molded article. In addition, an automobile interior part consisting of a skin layer made of the present composition containing the urethane (co)polymer, an olefin core, and a middle foam layer made of urethane foam can be recycled by crushing the part altogether.

Component (p)

In the present invention, component (p) is represented by the following chemical formula (I).

$$H_2C=CH-CH_2-O-(C_nH_{2n}O)_m-X \qquad (I)$$

wherein, n is an integer of from 2 to 5, and $C_nH_{2n}$ may be branched; m is the number of the repeating unit, $C_nH_{2n}O$; a number average molecular weight of the compound ranges from 200 to 6,000, and x represents H or $CH=CH_2$.

The compound having the following chemical formula (II) or (III) is preferred.

$$H_2C=CH-CH_2-O-(C_3H_6O)_{m1}-H \qquad (II)$$

wherein the number average molecular weight is in a range of from 1,200 to 1,800, $$H_2C=CH-CH_2-O-(C_3H_6O)_{m2}-CH=CH_2 \qquad (III)$$

wherein the number average molecular weight is in a range of from 2,500 to 3,500.

It should be noted that the number average molecular weight here is a relative value determined on the basis of polystyrene standards of known molecular weights. Incorporating the present compound makes the melt viscosity of the composition lower, so that a satisfactory melt flowability is attained even at a lower temperature, e.g., of from 220 to 280° C., than that used for molding a conventional thermoplastic elastomer. Further, the compound has good compatibility with various component (h). Especially when a thermoplastic polyurethane resin is used as component (h), the melt flowability of the composition is significantly improved.

In addition, the compound bleeds out little. A probable reason for this is that the double bond present at at least one end of the compound reacts with the resin component of the present composition during the dynamic vulcanization process of the elastomer or the kneading process with the polyurethane polymer, but the invention shall not be limited by this theory. Component (p) is incorporated in an amount of from 10 to 200 parts by weight, preferably from 20 to 150 parts by weight, more preferably from 25 to 150 parts by weight, per 100 parts by weight of component (a). If the amount is less than the aforesaid lower limit, sufficient improvement in the melt flowability is not effected. Meanwhile if the amount exceeds the aforesaid higher limit, component (p) may bleed out. Component (p) may be kneaded in the dynamic vulcanization process of components (a) to (i), or simultaneously with component (h) after this dynamic vulcanization, or after the kneading of component (h). Preferably, component (p) is kneaded in the dynamic vulcanization process of components (a) to (f), because the surface of a molded article shows reduced stickiness.

Component (u) Thermoplastic Polyurethane Resin Having a Specific Molecular Weight Range The present invention relates also to a composition characterized by containing a thermoplastic polyurethane resin which is derived from a polyol having a number average molecular weight of from 600 to 3,000, and which has a number average molecular weight of from 10,00 to 500,000. Incorporation of such a polyurethane resin having the relatively low molecular weight makes a melt viscosity of the resin composition lower even at a low shear force in a powder molding process, and still, a resultant molded article has a good scratch resistance. The urethane resin is derived from the polyol having a number average molecular weight of at least 600, preferably at least 800, and at most 3,000, preferably at most 2000, and has a number average molecular weight of from 10,000 to 500,000, preferably from 10,000 to 400,000, more preferably from 10,000 to 300,000.

If the molecular weight of the polyol is lower than the aforesaid lower limit, a scratch resistance and an adhesion strength to metals are low, and the composition hardens too slow, resulting in poor moldability. If the molecular weight is higher than the aforesaid higher limit, the melt flowability is not improved sufficiently. If the molecular weight of the thermoplastic urethane resin is lower than the aforesaid lower limit, the desired mechanical properties cannot be attained and the scratch resistance is low. If the molecular weight of the thermoplastic urethane resin is higher than the aforesaid higher limit, although the scratch resistance is high, the melt flowability is bad, and accordingly, the moldability is so bad to cause pinholes in a molded article. In the present invention, the molecular weight is measured by GPC on the basis of polystyrene standards of known molecular weights. Therefore, the molecular weight in the present invention is not an absolute value, but a relative value. It should be noted further that there may be about ±30% of deviation in the value depending on the GPC conditions such as standard samples, instrument type, and data processing method.

As a measure which reflects the molecular weight of the urethane resin, a flow beginning temperature may be used. The thermoplastic urethane resin in the present invention has the flow beginning temperature of from 120 to 150° C., preferably from 130 to 145° C. In the present invention, the flow beginning temperature is determined with a Koka type flow tester in the following conditions.

Die: 1 mm in diameter×1 mm in length
Hold Time: 10 minutes
Load: 30 kg

In the present invention, any thermoplastic polyurethane resin may be used as far as its molecular weight is in the aforesaid range. Typically, use is made of a thermoplastic polyurethane resin consisting of polyol, diisocyanate, and a chain extender. Examples of the polyol include polyesterpolyol, polyesteretherpolyol, polycarbonatepolyol and polyetherpolyol.

Examples of the polyesterpolyol include those prepared by dehydration condensation reaction of aliphatic dicarboxylic acid such as succinic acid, adipic acid, sebacic acid, and azelaic acid; aromatic dicarboxylic acid such as phthalic acid, terephthalic acid, isophthalic acid, and naphthalene dicarboxylic acid; or alicyclic dicarboxylic acid such as hexahydrophthalic acid, hexahydroterephthalic acid and hexahydroisophthalic acid, esters thereof, or acid anhydrides thereof; with ethylene glycol, 1,3-propylene glycol, 1,2-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, or a mixture thereof; and polylactonediol prepared by ring-opening copolymerization of a lactone monomer such as ε-caprolactone.

Examples of the polycarbonatepolyol include those prepared by reacting at least one polyhydric alcohol such as ethylene glycol, 1,3-propylene glycol, 1,2-propylene glycol, 1,3-butanediol, 1,4-butanediol, 1,5-pentanediol, 1,6-hexanediol; 3-methyl-1,5-pentanediol, neopentyl glycol, 1,8-octanediol, 1,9-nonanediol, and diethylene glycol, with diethylene carbonate, dimethyl carbonate, diethyl carbonate or the like.

Examples of the polyesteretherpolyol include those prepared by dehydration condensation reaction of aliphatic dicarboxylic acid such as succinic acid, adipic acid, sebacic acid, and azelaic acid; aromatic dicarboxylic acid such as phthalic acid, terephthalic acid, isophthalic acid, and naphthalene dicarboxylic acid; or alicyclic dicarboxylic acid such as hexahydrophthalic acid, hexahydroterephthalic acid and hexahydroisophthalic acid, esters thereof, or acid anhydrides thereof, with glycol such as dietylene glycol and propylene oxide adducts or a mixture thereof.

Examples of the polyetherpolyol include polyethylene glycol, polypropylene glycol, polytetramethylene ether glycol prepared by polymerising ethylene oxide, propylene oxide, tetrahydrofuran, respectively, and copolyethers thereof.

Among the polyols mentioned above, polyetherpolyols are preferred because they are more resistant to hydrolysis.

Examples of the isocyanates to be reacted with the above-mentioned polyols include tolylene diisocyanate, 4,4'-diphenylmethane diisocyanate(MDI), 1,5-naphthylene diisocyanate, tolidine diisocyanate, 1,6-hexamethylene diisocyanate, isophorone diisocyanate, xylilene diisocyanate (XDI), hydrogenated XDI, triisocyanate, tetramethylxylene diisocyanate(TMXDI), 1,6,11-undecane triisocyanate, 1,8-diisocyanatemethyloctane, lysine ester triisocyanate, 1,3,6-hexamethylene triisocyanate, and bicycloheptane triisocyanate. Among those, 4,4'-diphenylmethane diisocyanate (MDI) is preferred.

As the chain extender, a low molecular weight polyol may be used of which examples include aliphatic polyols such as ethylene glycol, 1,3-propylene glycol, 1,2-propylene glycol, 1,3-butanediol, 1,4-butanediol, 1,5-pentanediol, 1,6-hexanediol, 3-methyl-1,5'-pentanediol, neopentyl glycol, 1,8-octanediol, 1,9-nonanediol, diethylene glycol, 1,4-cyclohexanedimethanol, and glycerol; and aromatic glycols such as 1,4-dumethyrolbenzene, bisphenol A, and addicts of ethylene oxide or propylene oxide to bisphenol A.

Component (u) is blended in an amount of from 10 to 2,500 parts by weight, preferably from 180 to 2,500 parts by weight per 100 parts by weight of component (a). If the amount is less than 10 parts by weight, the intended effects of the invention is not realized sufficiently. If it exceeds 2,500 parts by weight, flexibility of a resultant elastomer composition is small to be little different from that of a polyurethane type homopolymer alone. By blending component (u), one can improve the melt flowability of the resin composition, and also the scratch resistance and oil resistance of a molded article therefrom. In addition, an automobile interior part consisting of a skin layer made of the present composition containing this polyurethane resin, an olefin core, and a middle foam layer made of urethane foam can be recycled by crushing the part altogether.

Component (s) (Hydrogenated) Block Copolymer Having a Specific Molecular Weight Range The present invention further provide a thermoplastic elastomeric composition comprising a (hydrogenated)block copolymer having a specific molecular weight range. The composition has an excellent melt flowability without a softening agent for rubber, or a plasticizer. Because the composition does not contain such a volatile component, no gas evolves during molding, so that a molded article from the composition conforms precisely to the mold.

Component (s) may be the same in chemical structure as component (a), provided that the lower limit of the weight average molecular weight reduced from polystyrene is 5,000, preferably 10,000, and more preferably 30,000 and the upper limit is 100,000, preferably 80,000. The polydispersity (Mw/Mn), i.e., a ratio of the weight average molecular weight (Mw) to the number average molecular weight (Mn), is preferably at most 10, more preferably at most 5, and most preferably at most 2. The (hydrogenated) block copolymer may have a molecular structure of straight, branched, or radiant chain or a mixture thereof. In the present invention, the molecular weight is measured by GPC in the following conditions and reduced from polystyrene standards of known molecular weights.

Eluent: THF

Flow rate: 1.0 ml/min

Detector: RI

Columns: TSK-GEL $GMH_{XL}2$, Polystyrene gel, ex Toso Co.,

Column temperature: 40° C., and

Sample concentration: 10 mg/10 ml of THF.

It should be noted that the molecular weight determined as described above are not an absolute value, but a relative value. It should be also noted that there may be about ±30% of deviation in the value depending on GPC conditions such as standard samples, instrument type and data processing method.

Examples of component (s) include SBS, SIS, SEBS and SEPS. particularly preferred (hydrogenated) block copolymer as component (s) in the invention is a hydrogenated block copolymer preferably with a weight average molecular weight of at least 5,000, more preferably at least 10,000, further preferably at least 30,000 and at most 100,000, more preferably at most 80,000, composed of polymeric block A composed mainly of styrene and polymeric block B which is composed mainly of isoprene and in which 70 to 100% by weight of isoprene has 1,4-microstructure and 90% of the aliphatic double bonds derived from isoprene is hydrogenated. More preferably, 90 to 100% by weight of isoprene has 1,4-microstructure in the aforesaid hydrogenated block copolymer.

Organic Peroxide

In the dynamic vulcanization in the present invention, an organic peroxide is preferably used. Examples of the organic peroxide include dicumyl peroxide, di-tert.-butyl peroxide, 2,5-dimethyl-2,5-di(tert.-butylperoxy)hexane, 2,5-dimethyl-2,5-di(tert.-butylperoxy)hexine-3,1,3-bis(tert.-butylperoxyisopropyl)benzene, 1,1-bis(tert.-butylperoxy)-3,3,5-trimethylcyclohexane, n-butyl-4,4,-bis(tert.-butylperoxy)valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide.

Among those, most preferred are 2,5-dimethyl-2,5-di(tert.-butylperoxy)hexane, 2,5-dimethyl-2,5-di(tert.-butylperoxy)hexine-3 and 1,3-bis(tert.-butylperoxyisopropyl)benzene in terms of smell, coloring and scorch stability.

The amount of the peroxide to be added is 0.1 to 4. 0 parts by weight, preferably 0.2 to 3.5 parts by weight, more preferably 0.6 to 3.0 parts by weight, per 100 parts by weight of component (a) or (s). It the amount is less than the lower limit, the required crosslink may not be obtained. Meanwhile, if the amount exceeds the upper limit, the crosslinking proceeds too much, causing poor dispersion of the crosslinked materials.

Crosslinking Aid

In the dynamic vulcanization in the present invention, it is preferred to use a crosslinking aid. The amount of the crosslinking aid is at least 0.1 part by weight, preferably at least 1.0 parts by weight, more preferably at least 2.0 parts by weight, and at most 10.0 parts by weight, preferably at most 8.0 parts by weight, more preferably 6.0 parts by weight per 100 parts by weight of component (a) or (s). If the amount is less,than the lower limit, the crosslinking may not occur sufficiently. Meanwhile, if it exceeds the upper limit, the crosslinking efficiency ends to decrease. It is preferred that the amount of the crosslinking aid added is about 1.0 to 3.0 times as large as the amount of the peroxide added.

Other Components

In addition to the above-described components, the present compositions may contain mold release agents such as stearic acid, silicone oils, lubricants such as polyethylene wax, pigments, inorganic fillers such as alumina, antioxidant agents, inorganic or organic blowing agents, flame-retardants such as hydrated metal compounds, red phosphorus, ammonium polyphosphate, antimony, and silicones, in concentrations which do not adversely affect the present invention.

Method Preparing the Compositions

The present composition may be prepared, for example, in the following processes. In a first step, the components except component (h) and component (u) are kneaded under heating with a crosslinking agent being added. Preferably, a crosslinking aid is also added. Component (p) may not be added here, but in a second step. Any conventional means for kneading rubbers or plastics may be used satisfactorily, such as single screw extruders, twin screws extruders, rolls, Banbury mixers, and various kneaders. In this step, a composition is obtained where each component is uniformly dispersed.

In a second step, component (h) or component (u) is added to the composition obtained in the first step and kneaded. Component (p) may be added in this step, if it is not to be subjected to the dynamic vulcanization of the first step. Generally, the kneading is performed in a single screw extruder, a twin screws extruder, rolls, a Banbury mixer, or various types of kneader. In this step, each component is further dispersed and at the same time the crosslinking reaction proceeds to complete. It is advantageous to side feed component (h) or component (u) to thereby perform this step consecutively after the dynamic vulcanization step described above.

A twin screws extruder with an L/D ratio of 47 or more or a Banbury mixer is preferred as the kneading means, because all of the steps may be carried out continuously. For instance, when a twin screws extruder is operated at a screw rotation speed of 80 to 250 rpm, preferably 80 to 200 rpm, each component is dispersed well to give good physical properties.

Resin Granule

The present granule has a somewhat elongated shape. Because the shape is substantially spherical, good fluidity is attained. The terms "longest diameter" of the granule herein mean the longest diameter of the granules seen in microphotographs at about 20–30×magnification. A range of the longest diameter may be determined according to a mold shape, resin components and so on. The longest diameter should be small enough for the granules to be cast in every corner of a mold without voids. However, if it is too small, advantages over conventional powder in the fluidity or handling properties are considered to be lost. In rotational powder molding of automobile interior parts, the longer diameter is preferably 400 $\mu$m or smaller, and more preferably 360 $\mu$m or smaller. Further, a ratio of the longest diameter to the shortest diameter, i.e., the shortest one of diameters perpendicular to the longest diameter of the granule seen in microphotographs at about 20–30× magnification is at most 3:1, preferably at most 2:1, and more preferably at most 1.5:1.

Method of Preparing the Granule

The above-mentioned granule oft present invention may be prepared by an underwater cutting method. In the underwater cutting method, granules are obtained by extruding the thermoplastic elastomeric composition into water through an extruder die and cutting the extruded resin with blades provided in the close proximity of the die. In the present invention, a cutting system, for example, Underwater Pelletizing Systems, ex Gala Industries Inc., is connected to an extruder, where the extruded resin composition is immediately cooled and cut. To obtain granules of the size specified in the present invention, an output aperture of the die is 3 mm or smaller, preferably 1.0 mm or smaller, more preferably 0.3 mm or smaller. A throughput of the thermoplastic elastomer composition per output port of the die is typically 10 to 250 g/hr, preferably 20 to 100 g/hr. A temperature of the water is typically 5 to 80° C., preferably 5 to 40° C. to prevent blocking of the die with the resin. An anti-blocking agent may be added to the water. Besides the underwater cutting method, other methods may be used where a molten resin composition is atomized by a spray or an atomizer and then cooled into granules.

Resin Blend

The present invention provides a resin blend which is obtained by mixing resin powder having a predetermined size with the aforesaid granules. Fluidity of granules is expected to deteriorate when mixed with powder. However, surprisingly, it has been found that when mixed with a predetermined amount of powder of the composition and size according to the present invention, the fluidity deteriorates only little. It has been found that the powder adheres to the periphery of the granules and the whole shows a fluid behavior like granules. It has also been found that no pinholes occurs even when molding is performed at a lower temperature than that conventionally employed. It is believed that the granules mixed with powder flow in narrow parts of a mold more easily, and also melt faster on account of the larger surface area than that of granules alone, both of which allow a lower molding temperature. As a result, the present resin blend enjoys both of good fluidity of granules and good melt flowability of a molten resin.

The resin powder is preferably prepared by known mechanical crushing or freeze crushing. Particularly, freeze crushing is preferred because the resultant powder does not coagulate. The present powder preferably has such a dimension that it passes a 42-mesh (355 $\mu$m) screen, more preferably a 50-mesh (300 $\mu$m) screen. If it is bigger than a 42-mesh size, such powder is bigger than the granules and even deteriorates the fluidity of the granules. If it is smaller than a 200-mesh size (75 $\mu$m) the fluidity of the granules tends to decrease, which makes blending of it non-sense. Practically, the powder prepared by freeze crushing is bigger than a 200-mesh size.

The resin powder in the present invention is prepared by crushing at least one material selected from the group consisting of thermoplastic elastomers, polyester polymers or copolymers, polyurethane polymers or copolymers, and polyamide polymers or copolymers. Besides the elastomer composed of the aforesaid components, examples of the thermoplastic elastomers include polystyrene elastomers, styrene-butadinene-styrene block copolymers, styrene-isoprene-styrene block copolymers, styrene-ethylene, butylene-styrene block copolymers, polyolefin elastomers, polydiolefin elastomers and the like. As the polyester polymers or copolymers, the polyurethane polymers or copolymers and the polyamide polymers or copolymers, those described for component (h) may be used. Among these, the same thermoplastic elastomer as that constitutes the present granule, or thermoplastic polyurethane resins are preferred because of good melt flowability of a melt composition.

The granules and the powder are mixed in a ratio of granules: powder of from 60 wt %:40 wt % to 95 wt %:5 wt %, preferably 70 wt %:30 wt % to 95 wt %:5 wt %, more preferably 80 wt %:20 wt % to 95 wt %:5 wt %. When the powder is mixed within the aforesaid range, almost the same levels of fluidity and handling properties as those of the granules are attained. If the amount of the granules exceeds 95 wt %, pinholes may not be avoided satisfactorily. If the amount of the powder exceeds the aforesaid upper limit, production cost of the blend is higher and separation between the powder and the granules may occur. Further, the handling property of the blend is bad due to, for instance, dust. The granules and the powder may be mixed by any known method, e.g., by weighing the granules and the powder in a predetermined ratio, and then, stirring and mixing them in a tumbler type mixer. It is preferred that the powder sticks uniformly on the surfaces of the granules.

EXAMPLES

The present invention will be further elucidated with reference to the following Examples and Comparative Examples. The values in the Tables are parts by weight, unless otherwise indicated.

I. Composition Comprising Component (P)

Examples I-1 to I-36, Comparative Examples I-1 to I-9 and Referential Examples I-1 to I-6.

Materials Used

Component (a): hydrogenated block copolymer, Septon 4077, ex Kuraray Co.,
- styrene content: 30% by weight,
- isoprene content: 70% by weight,
- number average molecular weight: 260,000,
- weight average molecular weight: 320,000,
- polydispersity: 1.23, and
- hydrogenation ratio: at least 90%.

Component (b) non-aromatic softening agent for rubber, Diana Process Oil, PW-90, ex Idemitsu Kosan Co.,
- type: paraffinic oil,
- weight average molecular weight: 540, and
- aromatic components content: 0.1% or lower.

Component (c) peroxide-decomposing type olefinic resin, CJ700, trade mark, ex Mitsui Petrochemical Industries Inc.,
- type: polypropylene(PP)
- MFR: 7 g/10 min., and
- crystallinity: Tm 166° C., ΔHm 82 J/mg.

Component (d): glycidyl methacrylate, ex Kanto Kagaku Co.

Component (e): maleic anhydride, ex Kanto Kagaku Co.

Component (f): liquid polybutadiene, R-45HT (trade mark), ex. Idemitsu Petrochemical Industries Inc.,
- having hydroxyl groups (acrylic type, primary) and
- copolymerization-reactive unsaturated double bonds (1,4 bonds: 80%), and
- number average molecular weight of 2,800.

Component (h):
- thermoplastic polyester type elastomer:
  Hytrel 4068 (trade mark), ex Toray -DuPont Inc.,
- thermoplastic polyamide type elastomer:
  Pebax 5533SNOO (trade mark), ex Toray Inc.,
- themoplastic polyurethane type elastomer:
  Pandex T-8180 (trade mark), ex. Dainippon Ink Co.

Organic Peroxide: Peroxa 25B (2,5-dimethyl-2,5-di(tert-butylperoxy)hexane, ex Nippon Oil & Fats Co.

Crosslinking Aid: NK Ester IND (mixture of 85% of 2-methyl-1,8-octanediol dimethaerylate and 15% of 1,9-nonanediol dimethacrylate), ex Shin-Nakamura Kagaku Co.

Component (p):

p-1: Unisafe PKA-5014, trade mark, ex Nippon Oil & Fats Co., having the following chemical formula (II) and a number average molecular weight of from 1,200 to 1,800.

$$H_2C=CH-CH_2-O-(C_3H_6O)_{m1}-H \quad (II)$$

p-2: Unisafe PKA-5018, trade mark, ex Nippon oil & Fats Co., having the following chemical formula (III) and a number average molecular weight of from 2,500 to 3,500.

$$H_2C=CH-CH_2-O-(C_3H_6O)_{m2}-CH=CH_2 \quad (III)$$

Compounds Used in the Referential Examples:

x-1: Unilube DM-18, trade mark, ex Nippon Oil & Fats Co., having the following chemical formula (IV) and a number average molecular weight of from 1,200 to 1,800.

$$CH_3-O-(C_3H_6O)_k-CH_3 \quad (IV)$$

x-2: Unilube DM-40, trade mark, ex Nippon Oil & Fats Co., having the above chemical formula (IV) and a number average molecular weight of from 2,500 to 3,500.

Preparation of Compositions

The components except Component (h) were kneaded in the weight ratios shown in Tables I-a to I-f in a twin-screw extruder. Then, the peroxide and the cross-linking aid were added and subjected to dynamic vulcanization at a kneading temperature of 200° C., a screw rotation of 350 rpm, and an extruder throughput of 20 kg/hr.

However, in Comparative Examples I-1 to 1-9, component (p) was not incorporated and, in Referential Examples I-1 to I-6, compound X-1 or X-2 was incorporated. Then, component (h) was side-fed and kneaded. At the exit of the extruder, a unit of Underwater palletizing Systems, ex Gala Industries, Inc., was installed to prepare granules having the longer diameter of about 0.3 mm.

Viscosity was measured at 200° C. with capilograph 1B (diameter of the capillary was 1 mm, length of the capillary was 20 mm and the shear rate was 6.08 sec$^{-1}$), ex Toyo Seiki Industries Co. Hardness of the compositions was measured at 15 seconds after the presser foot contacted with the specimen made of the composition, according to Japanese Industrial Standards (JIS) K 6253. Results are seen in Tables I-a to I-f.

TABLE I-a

| component | Ex. I-1 | Ex. I-2 | Ex. I-3 | Ex. I-4 | Ex. I-5 | Ex. I-6 | Ex. I-7 | Ex. I-8 | Ex. I-9 | Ex. I-10 | EX. I-11 | Ex. I-12 |
|---|---|---|---|---|---|---|---|---|---|---|---|---|
| (a) SEPS | 100 | 100 | 100 | 100 | 100 | 100 | 100 | 100 | 100 | 100 | 100 | 100 |
| (b) Softening agent for rubber | 125 | 125 | 125 | 125 | 125 | 125 | 125 | 125 | 125 | 125 | 125 | 125 |
| (c) PP | 19 | 19 | 19 | 19 | 19 | 19 | 19 | 19 | 19 | 19 | 19 | 19 |
| (d) Glycidyl methacrylate | 5 | 5 | 5 | 5 | 5 | 5 | 5 | 5 | 5 | 5 | 5 | 5 |
| (e) Maleic anhydride | 5 | 5 | 5 | 5 | 5 | 5 | 5 | 5 | 5 | 5 | 5 | 5 |
| (f) Liquid polybutadiene | 13 | 13 | 13 | 13 | 12 | 12 | 13 | 13 | 13 | 13 | 12 | 12 |
| (h) Polyurethane | 1105 | 1105 | 644 | 644 | 414 | 414 | 1105 | 1105 | 644 | 644 | 414 | 414 |
| (p) P-1 | 69 | 138 | 46 | 92 | 35 | 69 | — | — | — | — | — | — |
| P-2 | — | — | — | — | — | — | 69 | 138 | 46 | 92 | 35 | 69 |
| Organic peroxide | 3 | 3 | 3 | 3 | 3 | 3 | 3 | 3 | 3 | 3 | 3 | 3 |
| Crosslinking aid | 5 | 5 | 5 | 5 | 5 | 5 | 5 | 5 | 5 | 5 | 5 | 5 |
| Hardness (HDA) | 75 | 73 | 72 | 64 | 64 | 62 | 75 | 73 | 72 | 64 | 63 | 61 |
| Viscosity (Pa · s) | 544 | 400 | 579 | 440 | 600 | 500 | 530 | 385 | 570 | 400 | 594 | 430 |

TABLE I-b

| component | Comp. ex. I-1 | Comp. ex. I-2 | Comp. ex. I-3 | Ref. ex. I-1 | Ref. ex. I-2 |
|---|---|---|---|---|---|
| (a) SEPS | 100 | 100 | 100 | 100 | 100 |
| (b) Softening agent for rubber | 125 | 125 | 125 | 125 | 125 |
| (c) PP | 19 | 19 | 19 | 19 | 19 |
| (d) Glycidyl methacrylate | 5 | 5 | 5 | 5 | 5 |
| (e) Maleic anhydride | 5 | 5 | 5 | 5 | 5 |
| (f) Liquid polybutadiene | 13 | 13 | 12 | 13 | 13 |
| (h) Polyurethane | 1105 | 644 | 414 | 1105 | 1105 |
| (p) P-1 | — | — | — | X-1 | X-2 |
| P-2 | — | — | — | | |
| Organic peroxide | 3 | 3 | 3 | 3 | 3 |
| Crosslinking aid | 5 | 5 | 5 | 5 | 5 |
| Hardness (HDA) | 72 | 72 | 76 | 73 | 73 |
| Viscosity (Pa·s) | 700 | 696 | 600 | 532 | 450 |

TABLE I-c

| component | Ex. I-13 | Ex. I-14 | Ex. I-15 | Ex. I-16 | Ex. I-17 | EX. I-18 | Ex. I-19 | Ex. I-20 | EX. I-21 | EX. I-22 | Ex. I-23 | Ex. I-24 |
|---|---|---|---|---|---|---|---|---|---|---|---|---|
| (a) SEPS | 100 | 100 | 100 | 100 | 100 | 100 | 100 | 100 | 100 | 100 | 100 | 100 |
| (b) Softening agent for rubber | 125 | 125 | 125 | 125 | 125 | 125 | 125 | 125 | 125 | 125 | 125 | 125 |
| (c) PP | 19 | 19 | 19 | 19 | 19 | 19 | 19 | 19 | 19 | 19 | 19 | 19 |
| (d) Glycidyl methacrylate | 5 | 5 | 5 | 5 | 5 | 5 | 5 | 5 | 5 | 5 | 5 | 5 |
| (e) Maleic anhydride | 5 | 5 | 5 | 5 | 5 | 5 | 5 | 5 | 5 | 5 | 5 | 5 |
| (f) Liquid polybutadiene | 13 | 13 | 13 | 13 | 12 | 12 | 13 | 13 | 13 | 13 | 12 | 12 |
| (h) Polyurethane | 1105 | 1105 | 644 | 644 | 414 | 414 | 1105 | 1105 | 644 | 644 | 414 | 414 |
| (p) P-1 | 69 | 138 | 46 | 92 | 35 | 69 | — | — | — | — | — | — |
| P-2 | — | — | — | — | — | — | 69 | 138 | 46 | 92 | 35 | 69 |
| Organic peroxide | 3 | 3 | 3 | 3 | 3 | 3 | 3 | 3 | 3 | 3 | 3 | 3 |
| Crosslinking aid | 5 | 5 | 5 | 5 | 5 | 5 | 5 | 5 | 5 | 5 | 5 | 5 |
| Hardness (HDA) | 90 | 87 | 88 | 84 | 84 | 82 | 90 | 86 | 87 | 83 | 83 | 80 |
| Viscosity (Pa·s) | 5900 | 5200 | 6800 | 6500 | 7200 | 6600 | 5900 | 5100 | 6300 | 6000 | 6700 | 6300 |

TABLE I-d

| component | Comp. ex. I-4 | Comp. ex. I-5 | Comp. ex. I-6 | Ref. ex. I-3 | Ref. ex. I-4 |
|---|---|---|---|---|---|
| (a) SEPS | 100 | 100 | 100 | 100 | 100 |
| (b) Softening agent for rubber | 125 | 125 | 125 | 125 | 125 |
| (c) PP | 19 | 19 | 19 | 19 | 19 |
| (d) Glycidyl methacrylate | 5 | 5 | 5 | 5 | 5 |
| (e) Maleic anhydride | 5 | 5 | 5 | 5 | 5 |
| (f) Liquid polybutadiene | 13 | 13 | 12 | 13 | 13 |
| (h) Polyurethane | 1105 | 644 | 414 | 1105 | 1105 |
| (p) P-1 | — | — | — | X-1 | X-2 |
| P-2 | — | — | — | | |
| Organic peroxide | 3 | 3 | 3 | 3 | 3 |
| Crosslinking aid | 5 | 5 | 5 | 5 | 5 |
| Hardness (HDA) | 85 | 89 | 96 | 86 | 86 |
| Viscosity (Pa·s) | 7600 | 8150 | 7200 | 5750 | 4850 |

TABLE I-e

| component | Ex. I-25 | Ex. I-26 | Ex. I-27 | Ex. I-28 | Ex. I-29 | Ex. I-30 | Ex. I-31 | Ex. I-32 | Ex. I-33 | Ex. I-34 | Ex. I-35 | Ex. I-36 |
|---|---|---|---|---|---|---|---|---|---|---|---|---|
| (a) SEPS | 100 | 100 | 100 | 100 | 100 | 100 | 100 | 100 | 100 | 100 | 100 | 100 |
| (b) Softening agent for rubber | 125 | 125 | 125 | 125 | 125 | 125 | 125 | 125 | 125 | 125 | 125 | 125 |
| (c) PP | 19 | 19 | 19 | 19 | 19 | 19 | 19 | 19 | 19 | 19 | 19 | 19 |
| (d) Glycidyl methacrylate | 5 | 5 | 5 | 5 | 5 | 5 | 5 | 5 | 5 | 5 | 5 | 5 |
| (e) Maleic anhydride | 5 | 5 | 5 | 5 | 5 | 5 | 5 | 5 | 5 | 5 | 5 | 5 |
| (f) Liquid polybutadiene | 13 | 13 | 13 | 13 | 12 | 12 | 13 | 13 | 13 | 13 | 12 | 12 |
| (h) Polyurethane | 1105 | 1105 | 644 | 644 | 414 | 414 | 1105 | 1105 | 644 | 644 | 414 | 414 |
| (p) P-1 | 69 | 138 | 46 | 92 | 35 | 69 | — | — | — | — | — | — |
| P-2 | — | — | — | — | — | — | 69 | 138 | 46 | 92 | 35 | 69 |
| Organic peroxide | 3 | 3 | 3 | 3 | 3 | 3 | 3 | 3 | 3 | 3 | 3 | 3 |
| Crosslinking aid | 5 | 5 | 5 | 5 | 5 | 5 | 5 | 5 | 5 | 5 | 5 | 5 |
| Hardness (HDA) | 84 | 80 | 78 | 74 | 68 | 64 | 64 | 80 | 76 | 73 | 67 | 64 |
| Viscosity (Pa·s) | 6500 | 5800 | 7200 | 6200 | 7900 | 6400 | 6400 | 5600 | 7000 | 6150 | 7600 | 6300 |

TABLE I-f

| component | Comp. ex. I-7 | Comp. ex. I-8 | Comp. ex. I-9 | Ref. ex. I-5 | Ref. ex. I-6 |
|---|---|---|---|---|---|
| (a) SEPS | 100 | 100 | 100 | 100 | 100 |
| (b) Softening agent for rubber | 125 | 125 | 125 | 125 | 125 |
| (c) PP | 19 | 19 | 19 | 19 | 19 |
| (d) Glycidyl methacrylate | 5 | 5 | 5 | 5 | 5 |
| (e) Maleic anhydride | 5 | 5 | 5 | 5 | 5 |
| (f) Liquid polybutadiene | 13 | 13 | 12 | 13 | 13 |
| (h) Polyurethane | 1105 | 644 | 414 | 1105 | 1105 |
| (p) P-1 | — | — | — | X-1 | X-2 |
| P-2 | — | — | — | | |
| Organic peroxide | 3 | 3 | 3 | 3 | 3 |
| Crosslinking aid | 5 | 5 | 5 | 5 | 5 |
| Hardness (HDA) | 80 | 80 | 78 | 80 | 80 |
| Viscosity (Pa · s) | 8350 | 8650 | 7900 | 6350 | 5350 |

The viscosity at the low sheer force of the compositions containing component (p) according to the present invention were significantly lower than those of the compositions of Comparative Examples without component (p). Further, no bleeding-out was observed in the molded articles from the present compositions.

Compounds x-1 and x-2 used in the Referential Examples have almost the same structure and molecular weight as p-1 and p-2 of the invention, respectively, except that they do not have a double bond at the terminal. The incorporation of x-1 or x-2 lowered the melt viscosity of the resultant compositions of Referential Examples I-1 to I-6, but the molded articles from the compositions showed clouding upon being bent, and bleed-out was observed.

As seen above, the present thermoplastic elastomer compositions for powder molding have good melt flowability and can be molded at a lower mold temperature on account of the component having the specific chemical structure. Further, the component bleeds out hardly from a molded article.

II. Compositions Comprising a Thermoplastic Polyurethane Resin Having a Specific Molecular Weight Range Examples II-1 and II-2 and Comparative Examples II-1 to II-6.

Materials Used

Components (a) to (f), an organic peroxide and a cross-linking aid were the same as those used in Examples I-1 to I-36.

Component (u), thermoplastic polyurethane resin: as shown in Table II-b, 5 kinds of polyurethane resins derived from polyols with different molecular weights were used.

Molecular Weight Measurement Method

Molecular weight was measured by GPC in the following conditions and reduced from polystyrene standards.

Eluent: dimetylformamide(DMF)

Flow rate: 1.0 ml/min

Detector: RI

Columns: Shodex KD-BOM×3

Column temperature: 40° C.

Evaluation Methods and Criteria

1. Viscosity: measured at 200° C. with Capilograph 1B, ex Toyo Seiki Industries Co.

2. Tensile Strength, Elongation, Modulus at 100% Elongation: determined in accordance with JIS K 7161. Test pieces were prepared by punching out an injection-molded sheet having a thickness of 2 mm, using a No.3 dumbbell die.

3. Scratch Resistance Test

The surface of a test piece was rubbed 1,200 cycles with a sheet of No.3 shirting with a load of 100 g being applied. The surface was visually observed for scratches. The scratch resistance was rated according to the following criteria.

OK: There is almost no scratch on the surface, and no dirt was seen on the sheet of No.3 shirting.

NG: There are significant scratches on the surface, or dirt was seen on the sheet of No.3 shirting.

4. Hardness: measured according to JIS K 6253 at 15 seconds after the presser foot contacted with the specimen made of the composition, according to Japanese Industrial Standards (JIS) K 6253.

5. Mold Releasing Property: evaluated according to the following criteria;

○: a molded article can be taken out from a mold without difficulties and without deformation.

X: a part of a molded article remains in a mold and/or deformation is observed in the article taken out from the mold.

Method of Preparing the Compositions

The components (a) to (f) were kneaded in the weight ratio shown in Table II-a in a twin-screw extruder. Then, to the kneaded resin, the peroxide and the cross-linking aid were added and subjected to dynamic vulcanization at a kneading temperature of 200° C., a screw rotation speed of 350 rpm and an extruder throughput of 20 kg/hr. After that, component (u) was side-fed and kneaded, except in Comparative Example II-5. At the exit of the extruder, a unit of Underwater palletizing Systems, ex Gala Industries, Inc., was installed to prepare granules having the longer diameter of about 0.3 mm. In Comparative Example II-6, granules were prepared from pellets of component (u). Test pieces for the various evaluation tests were prepared from the granule samples and evaluated.

TABLE II-a

| component | Ex. II-1, Comp. ex. II-1 to II-4 | Ex. II-2 | Comp. ex. II-5 | Comp. ex. II-6 |
|---|---|---|---|---|
| (a) SEPS | 100 | 100 | 100 | — |
| (b) Softening agent for rubber | 118 | 118 | 118 | — |
| (c) PP | 18 | 18 | 18 | — |
| (d) Glycidyl methacrylate | 5 | 5 | 5 | — |
| (e) Maleic anhydride | 5 | 5 | 5 | — |
| (f) Liquid polybutadiene | 12 | 12 | 12 | — |
| (u) Polyurethane | 643 | 2480 | — | 100 |
| Organic peroxide | 3 | 3 | 3 | — |
| Crosslinking aid | 5 | 5 | 5 | — |

TABLE II-b

|  | Ex. II-1 | Ex. II-2 | Comp. ex. II-1 | Comp. ex. II-2 | Comp. ex. II-3 | Comp. ex. II-4 | Comp. ex. II-5 | Comp. ex. II-6 |
|---|---|---|---|---|---|---|---|---|
| Mn of TPU | $1.9 \times 10^5$ | $1.9 \times 10^5$ | $3.5 \times 10^5$ | $4.0 \times 10^5$ | $5.3 \times 10^5$ | $6.2 \times 10^5$ | — | $1.9 \times 10^5$ |
| Mn of polyol | $1.0 \times 10^3$ | $1.0 \times 10^3$ | $3.2 \times 10^3$ | $5.0 \times 10^2$ | $5.0 \times 10^2$ | $1.0 \times 10^3$ | — | $1.0 \times 10^3$ |
| Viscosity (Pa · s) (shear rate 6.08 sec$^{-1}$) | 611.9 | 350 | 1408 | 943.3 | 1397 | 910.3 | 4000 | 300 |
| Tensile strength (MPa) | 6.97 | 14 | 20.47 | 20.50 | 20.65 | 18.06 | 6.6 | 20 |
| Elongation (%) | 613.2 | 800 | 641.4 | 500 | 470.4 | 519.9 | 650 | 800 |
| Modulus at 100% E. (MPa) | 3.25 | 3.8 | 2.9 | 3.5 | 3.67 | 3.74 | 1.1 | 3.9 |
| Scratch resistance | OK | OK | OK | NG | NG | OK | NG | OK |
| Hardness (HAD) | 68 | 73 | 63 | 66 | 68 | 70 | 50 | 80 |
| Mold releasing property | ○ | ○ | ○ | x | x | ○ | ○ | ○ |

As seen in Table II-b, the present resin compositions of Examples II-1 and II-2 showed a lower viscosity at the low shear force, and thus had better melt flowability than those of the compositions in Comparative Examples II-1 to II-4. Further, the molded articles prepared from the compositions of Example II-1 and II-2 showed better scratch resistance. On the other hand, the composition of Comparative Example II-1 containing the polyol having a higher molecular weight and the composition of Comparative Example II-4 containing the polyurethane having a higher molecular weight showed worse melt flowability. The compositions of Comparative Examples II-2 and II-3 in which the molecular weight of the polyol was lower than the lowest limit specified in the present invention showed poorer scratch resistance. The composition of Comparative Example II-5 with no urethane resin was inferior both in the melt flowability and in scratch resistance. The urethane resin alone in Comparative Example II-6 showed better melt flowability, but the molding cycle time was longer due to slower hardening. Further, the obtained molded article from the urethane resin was very hard and uncomfortable to the touch.

As described above, the present composition comprising a thermoplastic polyurethane resin having a specific molecular weight range has an improved melt flowability, allowing powder molding at a lower mold temperature. Further, the molded article therefrom is soft to the touch, and has excellent scratch resistance.

XII. Composition Comprising a (Hydogenated) Block Copolymer Having a Specific Molecular Weight Range Examples III-1 to III-6, Comparative Examples III-1 and III-2.
Materials Used
  Component (s): hydrogenated block copolymer(SEPS), Septon 2002, ex Kuraray Co.,
    styrene content: 30% by weight,
    isoprene content: 70% by weight,
    number average molecular weight: 55,000,
    weight average molecular weight: 60,000,
    polydispersity: 1.09, and
    hydrogenation ratio: at least 90%.
  Components (d) to (h), an organic peroxide and a crosslinking aid were the same as those used in Examples I-1 to I-36.
  Peroxide-decomposing type olefinic resin: BC03C, trademark, ex Mitsubishi Chemical Industries Inc.,
    type: Polypropylene(PP),
    MFR: 30 g/10 min.

Hydrogenated block copolymer used in the Comparative Examples: Septon 4077, ex Kuraray Co.
Non-aromatic softening agent for rubber, Diana Process Oil, PW-90, ex Idemitsu Kosan Co.
Evaluation Methods and Criteria
  1. Hardness: measured by the JIS type-A method described in JIS K6251.
  2. Tensile strength: determined according to JIS K6251 on a No.3 dumbbell test piece prepared from an injection-molded sheet of 2 mm thick.
  3. Modulus at 100% elongation: determined according to JIS K6251 on a No.3 dumbbell test piece prepared from an injection-molded sheet of 2 mm thick.
  4. Elongation: determined according to JIS K6251 on a No.3 dumbbell test piece prepared from an injection-molded sheet of 2 mm thick.
  5. Amount of evolved gas: the amount of white fume evolved from a nozzle was visually rated when a cylinder of the molding machine was purged at 200° C. with the resin composition of each Example or Comparative Example. The composition with more fume is rated as X, and the one with less fume is rated as ○.
  6. Molding cycle time: the optimum time required to injection mold a sheet of 150 mm long by 25 mm wide by 4 mm thick.
    Evaluation criteria are as follows;
    ○: 30 seconds or shorter,
    Δ: longer than 30 seconds, at most 60 seconds, and
    X: longer than 60 seconds.
  7. Blow Moldability: rated by a maximum ratio of an outer diameter of a blow-molded article to that of a parison.
    Evaluation criteria are as follows;
    ○: 3 or more,
    Δ: from 2 to less than 3, and
    X: less than 2.
  8. Conformity to a Mold: evaluated by visually observing the surface of an injection-molded article using a mold with leather grain pattern.
    Evaluation criteria are as follows;
    ○: the surface precisely conforms to the mold,
    Δ: the surface pattern is a little rounded, and
    X: sinks or other defects are found on the surface.
Preparation of the Compositions
  The compositions were prepared in the weight ratios as seen in Table III-a when component (h) was the polyurethane resin, and as seen in Table III-b when component (h) was the polyester resin. At first, the components except component (h) were kneaded in a twin-screw extruder. Then, the peroxide and the cross-linking aid were added and subjected to dynamic vulcanization at a kneading temperature of 200° C., a screw rotation of 350 rpm and an extruder throughput of 20 kg/hr. Subsequently, component (h) was side-fed and kneaded. The resultant pellets were used for each evaluation.

TABLE III-a

| component | Mw | Ex. III-1 | Ex. III-2 | Ex. III-3 | Comp. Ex. III-1 |
|---|---|---|---|---|---|
| (a) SEPS | 6.5 × E4 | 100 | 100 | 100 | 0 |
| (d) Glycidyl methacrylate | | 2.5 | 2.5 | 2.5 | 5 |
| (e) Maleic anhydride | | 2.5 | 2.5 | 2.5 | 5 |
| (f) Liquid polybutadiene | | 12.5 | 12.5 | 12.5 | 12.5 |
| (h) Polyurethane | | 573.0 | 548.0 | 573.0 | 1163.0 |
| Peroxide-decom. olefine | | 0 | 0 | 6.25 | 0 |
| Organic peroxide | | 2.5 | 2.5 | 2.5 | 5 |
| Crosslinking aid | | 1.25 | 1.25 | 1.25 | 2.75 |
| SEPS | 33.8 × E4 | | | | 100 |
| Softening agent for rubber | | | | | 125 |
| Evolved gas | | ○ | ○ | ○ | x |
| Conformity to a mold | | ○ | ○ | ○ | Δ |
| Molding cycle time | | ○ | ○ | ○ | Δ |
| Blow moldability | | ○ | ○ | ○ | Δ |
| Hardness | | 80 | 80 | 80 | 75 |
| Tensile strength (MPa) | | 20 | 23 | 23 | 22 |
| Modulus at 100% E. (MPa) | | 4.4 | 4.6 | 4.6 | 3.8 |
| Elongation (%) | | 600 | 610 | 610 | 660 |

TABLE III-b

| component | Mw | Ex. III-4 | Ex. III-5 | Ex. III-6 | Comp. ex. III-2 |
|---|---|---|---|---|---|
| (a) SEPS | 6.5 × E4 | 100 | 100 | 100 | 0 |
| (d) Glycidyl methacrylate | | 2.5 | 2.5 | 2.5 | 5 |
| (e) Maleic anhydride | | 2.5 | 2.5 | 2.5 | 5 |
| (f) Liquid polybutadiene | | 12.5 | 12.5 | 12.5 | 12.5 |
| (h) Polyurethane | | 290.0 | 295.0 | 300.0 | 600.0 |
| Peroxide-decom. olefine | | — | — | 6.25 | — |
| Organic peroxide | | 2.5 | 2.5 | 2.5 | 5 |
| Crosslinking aid | | 1.25 | 1.25 | 1.25 | 2.75 |
| SEPS | 33.8 × E4 | | | | 100 |
| Softening agent for rubber | | | | | 125 |
| Evolved gas | | ○ | ○ | ○ | x |
| Conformity to a mold | | ○ | ○ | ○ | Δ |
| Molding cycle time | | ○ | ○ | ○ | Δ |
| Blow moldability | | ○ | ○ | ○ | Δ |
| Hardness | | 85 | 85 | 85 | 80 |
| Tensile strength (MPa) | | 13 | 14 | 15 | 22 |
| Modulus at 100% E. (MPa) | | 5 | 5.1 | 5.2 | 5 |
| Elongation (%) | | 600 | 610 | 610 | 660 |

As seen in Tables III-a and III-b, gas evolved little from the present compositions, and the molded articles prepared conformed precisely to the mold. Further, the present composition showed good melt flowability and a shorter cycle time even without a softening agent. The obtained molded articles had no problem in hardness and showed good mechanical properties such as tensile strength. In addition, a larger blow ratio was allowed because gas did not evolve and the draw-down was less.

As described above, the present thermoplastic elastomeric composition does not contain a volatile softening agent, and consequently, gas does not evolve during a molding process, which results in good conformity to a mold. The present composition contains a block copolymer having a specific molecular weight range, and, as a result, has good melt flowability and moldability.

IV. Resin Blend

Examples IV-1 to IV-7, Comparative Examples IV-1 and Referential Example IV-1.

Materials Used

As component (a), Septon 4077, ex Kuraray Co. was used, Components (b) to (h) were the same as those used in Examples I-1 to I-36.

Materials used in the Comparative Example:

Ethylene-ethyl acrylate type elastomer, NUC-6070, trade name, ex Nihon Unicar Co., Ltd, comonomer content: 25 wt %, and melt index: 250 g/10 mins.

Evaluation Methods and Criter

1. Pinholes

The number of pinholes with a diameter of from about 0.1 mm to 0.3 mm were counted visually in a sample piece of 140 mm×140 mm'1 mm cut out from molded articles and rated with the following criteria.

| Rate | Number of Pinholes |
|---|---|
| A | 0 |
| B | 1–10 |
| C | more than 10 |

2. Scratch Resistance Test

The surface of a test piece was rubbed 1,200 cycles with a sheet of No.3 shirting with a load of 100 g being applied. The surface was visually observed for scratches and the scratch resistance was rated according to the following criteria.

○: There is almost no scratch on the surface, and no dirt is seen on the sheet of No.3 shirting.

X: There are significant scratches on the surfaces or dirt is seen on the sheet of No.3 shirting.

Preparation of the Granules

In Examples IV-1 to IV-7 and Referential Example IV-1, the components except Component (h) were kneaded in the weight ratios shown in the Table IV-a with a twin-screw extruder. Then, the peroxide and the cross-linking aid were added and subjected to dynamic vulcanization at a kneading temperature of 200° C., a screw rotation of 350 rpm, and an extruder throughput of 20 kg/hr.

After that, component (h) was side-fed and kneaded. At the exit of the extruder, a unit of Underwater Pelletizing Systems, ex Gala Industries, Inc., was installed to prepare granules having the longer diameter of about 0.3 mm. Granules from the compositions of the Comparative Examples were prepared as above.

TABLE IV-a

| Component | Parts by Weight |
|---|---|
| (a) SEPS | 100 |
| (b) Softening agent for rubber | 125 |
| (c) PP | 19 |
| (d) Grycidyl methacrylate | 5 |
| (e) Maleic anhydride | 5 |
| (f) Liquid polybutadiene | 13 |
| (h) TPU or the substituent | 1105 |
| Organic peroxide | 3 |
| Cross-linking aid | 5 |

Preparation of the Powder and Mixing with the Granules

In Example IV-1, the granules obtained were cooled to −100° C. with liquid nitrogen and freeze-crushed to powder.

In Examples IV-2 to IV-7, pellets of the aforementioned polyurethane resin (h) were freeze-crushed in the same manner as in Example IV-1. The obtained powder was screened with a standard 42-mesh screen and powder which passed the screen was collected. In Examples IV-1 to IV-7, the granules were combined with the powder in the ratios shown in Table IV-b and stirred in a tumbler mixer. No powder was blended in Referential Examples IV-1 and Comparative Example IV-1.

Powder Molding with the Blend

The blend thus obtained was put into a mold of 400 mm deep with the bottom of 145 mm×145 mm and an opening of 165 mm×165 mm. The mold had the leather grain pattern on its inner surface. The opening of the mold was closed with another mold and fixed together. The pair of the molds were rotated at 90 degrees in a reciprocating manner around a rotational axis of a single axis rotating instrument to let the resin meld and adhere to the surface of the mold. After 5 times the reciprocation, the resin which did not adhere to the mold was recovered. Then, the mold was head at the temperature of the mold shown in Table IV-b for 5 minutes, and then cooled, and the molded article was taken out.

TABLE IV-b

| Powder | | Mold Temperature (° C.) | | | | Scratch resistance |
|---|---|---|---|---|---|---|
| constituent | wt % | 240° C. | 260° C. | 280° C. | 300° C. | |
| Ex. IV-1 | same as that of granule | 10 | C | B | A | A | ○ |
| Ex. IV-2 | TPU | 5 | C | B | A | A | ○ |
| Ex. IV-3 | TPU | 10 | B | A | A | A | ○ |
| Ex. IV-4 | TPAE | 5 | C | B | A | A | ○ |
| Ex. IV-5 | TPAE | 10 | B | A | A | A | ○ |
| Ex. IV-6 | TPEE | 5 | C | B | A | A | ○ |
| Ex. IV-7 | TPEE | 10 | B | A | A | A | ○ |
| Ref. ex. IV-1 | — | — | — | C | B | A | ○ |
| Comp. ex. IV-1 | — | — | C | C | C | B | x |

As seen in Table IV-b, there was no pinhole in the molded articles obtained from the present resin blend containing the powder, even at the mold temperature of 280° C. Particularly, the blend containing 10 wt % of the powder of component (h) (Examples IV-3, -5 and -7), there was no pinhole in the mold articles even at 260° C. on the other hand, for the materials which did not contain the powder (Referential Example IV-1) and a conventional olefinic elastomer, EEA (Comparative Example IV-1), the temperature of the mold should be 300° C. or higher to avoid pinholes.

As described above, while the present blend maintains a good fluidity of the granules, it also has good melt flowability to give a molded article without pinholes even at a mold temperature lower than that conventionally employed. This is attributed to specific resin powder blended with the resin granules.

What is claimed:

1. A thermoplastic elastomeric resin composition for powder molding, comprising
    a composition prepared by a dynamically vulcanizing
        100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
        20 to 300 parts by weight of (b) non-aromatic softening agent for rubber,
        10 to 150 parts by weight of (c) a peroxide-decomposing olefinic resin and/or a copolymer containing said resin,
        0.01 to 15 parts by weight of (a) an unsaturated glycidyl compound,
        0.01 to 15 parts by weight of (e) an unsaturated carboxylic acid or a derivative thereof, and
        1 to 30 parts by weight of (f) a liquid polybutadiene, and
        10 to 2,500 parts by weight of (h) at least one material selected from the group consisting of polyester polymers and copolymers, polyurethane polymers and copolymers, and polyamide polymers and copolymers;
    characterized in that
        10 to 200 parts by weight of (p) a compound represented by the following chemical formula (I) is also dynamically vulcanized or kneaded with said vulcanized composition or with said vulcanized composition and component (h):

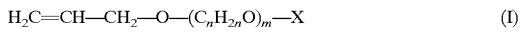

$$H_2C{=}CH{-}CH_2{-}O{-}(C_nH_{2n}O)_m{-}X \qquad (I)$$

wherein n is an integer of from 2 to 5, $C_nH_{2n}$ may be branched, x represents H or $CH{=}CH_2$, m is the number of the repeating unit, $C_nH_{2n}O$, and a number average molecular weight of the compound is in a range of from 200 to 6,000.

2. The thermoplastic elastomeric resin composition for powder molding according to claim 1, wherein component (p) is a chemical compound represented by the following chemical formula (II) or (III):

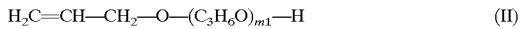

$$H_2C{=}CH{-}CH_2{-}O{-}(C_3H_6O)_{m1}{-}H \qquad (II)$$

wherein the number average molecular weight is in a range of from 1,200 to 1,800,

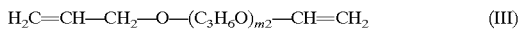

$$H_2C{=}CH{-}CH_2{-}O{-}(C_3H_6O)_{m2}{-}CH{=}CH_2 \qquad (III)$$

wherein the number average molecular weight is in a range of from 2,500 to 3,500.

3. A thermoplastic elastomeric resin composition for powder molding, comprising
    a composition prepared by dynamically vulcanizing
        100 parts by weight of (a) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
        20 to 300 parts by weight of (b) a non-aromatic softening agent for rubber,
        10 to 150 parts by weight of (c) a peroxide-decomposing olefinic resin and/or a copolymer containing said resin,
        0.01 to 15 parts by weight of (d) an unsaturated glycidyl compound,
        0.01 to 15 parts by weight of (e) an unsaturated carboxylic acid or a derivative thereof, and
        1 to 30 parts by weight of (f) a liquid polybutadiene; and 10 to 2,500 parts by weight of (u) a thermoplastic polyurethane resin, characterized in that said component (u) is derived from a polyol having a number average molecular weight of from 600 to 3,000 and has a number average molecular weight of from 10,000 to 500,000.

4. The thermoplastic elastomeric resin composition for powder molding according to claim 3, wherein component (u), thermoplastic polyurethane resin, is derived from a polyol having a number average molecular weight of from 800 to 2,000 and has a number average molecular weight of from 10,000 to 300,000.

5. The thermoplastic elastomeric resin composition for powder molding according to claim 3 or 4, wherein the thermoplastic polyurethane resin (u) is contained in an amount of 180 to 2,500 parts by weight per 100 parts by weight of component (a).

6. A thermoplastic elastomeric resin granule for powder molding, comprising the thermoplastic elastomeric composition for powder molding according to any one of claims 1–4 and having a longest diameter of 400 µm or less and a ratio of the longest diameter to a shortest diameter of from 3:1 to 1:1.

7. A thermoplastic elastomeric resin composition, comprising
   a composition prepared by dynamically vulcanizing
      100 parts by weight of (s) a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
      0.01 to 15 parts by weight of (d) an unsaturated glycidyl compound,
      0.01 to 15 parts by weight of (e) an unsaturated carboxylic acid or a derivative thereof, and
      1 to 30 parts by weight of (f) a liquid polybutadiene; and
      10 to 2,500 parts by weight of (h) an at least one material selected from the group consisting of polyester polymers or copolymers, polyurethane polymers or copolymers, and polyamide polymers or copolymers, characterized in that said component (s) has a weight average molecular weight reduced from polystyrene of from 5,000 to 100,000.

8. The thermoplastic elastomeric resin composition according to claim 7, wherein the weight average molecular weight of component (s) reduced from polystyrene is in a range of from 10,000 to 100,000.

9. The thermoplastic elastomeric resin composition according to claim 7 or 8, wherein component (h) is at least one material selected from the group consisting of polyurethane polymers or copolymers.

10. A thermoplastic elastomeric resin granule for powder molding, comprising the thermoplastic elastomeric composition according to any one of claims 7 to 8, and having a longest diameter of 400 µm or less and a ratio of the longest diameter to a shortest diameter of from 3:1 to 1:1.

11. The thermoplastic elastomeric resin granule for powder molding according to claim 6, wherein the granule is prepared by an underwater cutting method.

12. A thermoplastic elastomeric resin blend, characterized in that said compound comprising
   60 to 95 weight per cent of the resin granule according to claim 6 or 10, and
   40 to 5 weight per cent of resin powder prepared by freeze-crushing at least one material selected from the group consisting of thermoplastic elastomers, polyester polymers or copolymers, polyurethane polymers or copolymers, and polyamide polymers or copolymers, said powder having a size to pass a 42-mesh screen.

13. The resin blend according to claim 12, wherein the resin powder comprises a material selected from the group consisting of the same thermoplastic elastomer resin as that constituting the granule and polyurethane polymers or copolymers.

14. The thermoplastic elastomeric resin granule for powder molding according to claim 10, wherein the granule is prepared by an underwater cutting method.

* * * * *